United States Patent [19]
Burris et al.

[11] 3,727,882
[45] Apr. 17, 1973

[54] METERING VALVE

[76] Inventors: Glenn A. Burris; Joseph P. Lares, both of 967 Center Street, San Carlos, Calif. 94070

[22] Filed: Aug. 19, 1971

[21] Appl. No.: 173,035

[52] U.S. Cl. ................251/209, 137/556, 251/344, 251/345
[51] Int. Cl. ........................................F16k 5/10
[58] Field of Search ...............137/556; 251/208, 251/209, 340, 344, 345, 341, 343, 310, 311

[56] References Cited

UNITED STATES PATENTS

| | | | |
|---|---|---|---|
| 453,109 | 5/1891 | Dreisorner | 251/344 |
| 2,911,008 | 11/1959 | Du Bois | 251/208 X |
| 3,536,296 | 10/1970 | Burris | 251/208 |
| 2,424,328 | 6/1947 | Pars | 251/209 |
| 3,005,468 | 10/1961 | Erwin et al. | 137/556 X |
| 2,868,155 | 1/1959 | Phillips | 251/209 |
| 3,033,226 | 5/1962 | Allen | 251/344 |

FOREIGN PATENTS OR APPLICATIONS

| | | | |
|---|---|---|---|
| 221,638 | 11/1957 | Australia | 251/344 |

*Primary Examiner*—Alan Cohan
*Assistant Examiner*—Gerald A. Michalsky
*Attorney*—Alexander B. Blair et al.

[57] ABSTRACT

The present invention relates to a metering valve in which a valve plug has an annular groove tapering from zero width to a full width with the groove communicating with a port in a rotatable valve seat member. The relative position of the groove with respect to the port determines the size of the opening through which fluid is to pass to permit any desired degree of metering from 0 to 100 percent.

The valve plug is semi-spherical in the preferred form of the invention and is conical in a modified form of the invention. In another modified form of the invention the valve seat member is provided with a scale to indicate the relative position of the valve.

1 Claim, 9 Drawing Figures

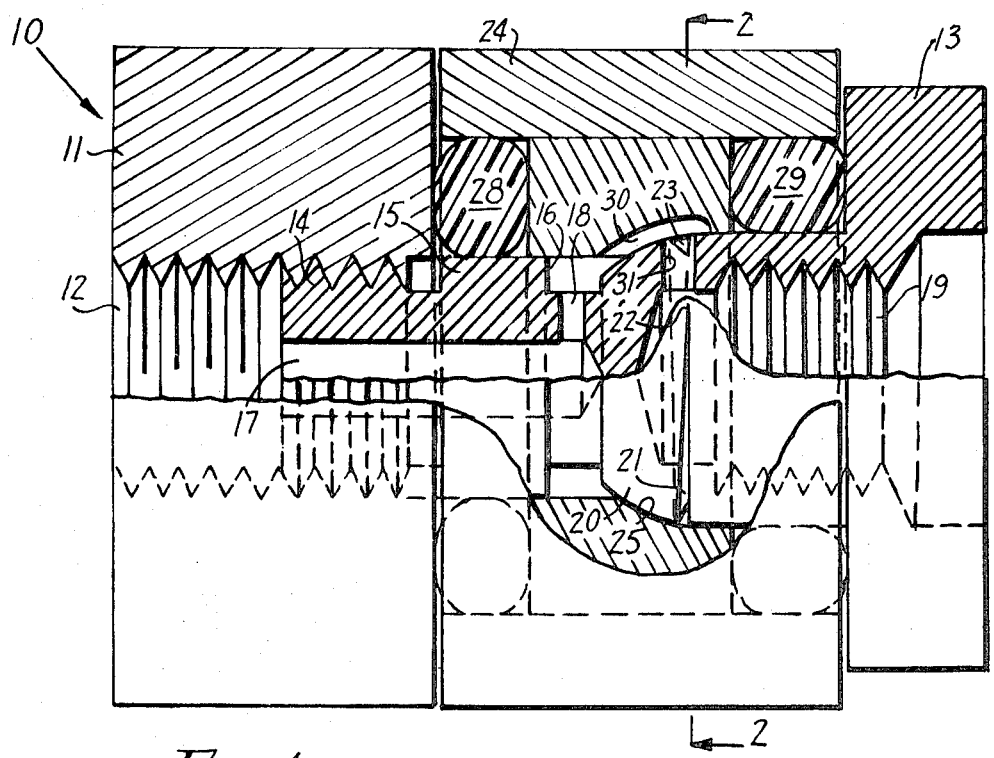
Fig.1
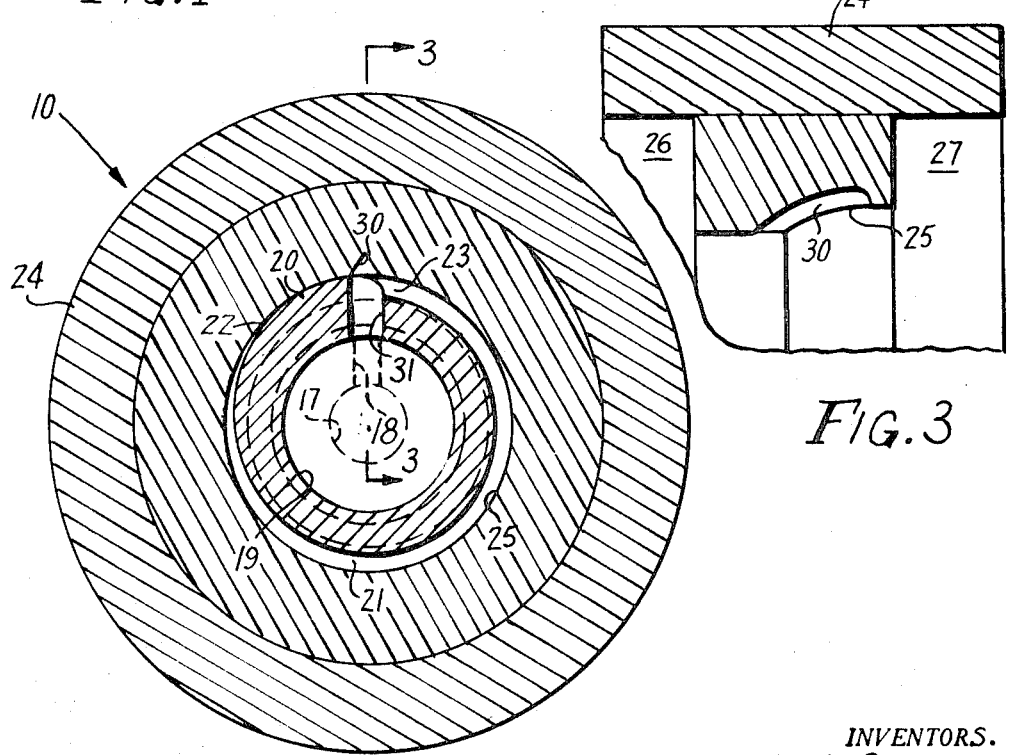
Fig.2
Fig.3
INVENTORS.
GLENN A. BURRIS
BY JOSEPH P. LARES
Victor J. Evans &co.
ATTORNEYS.

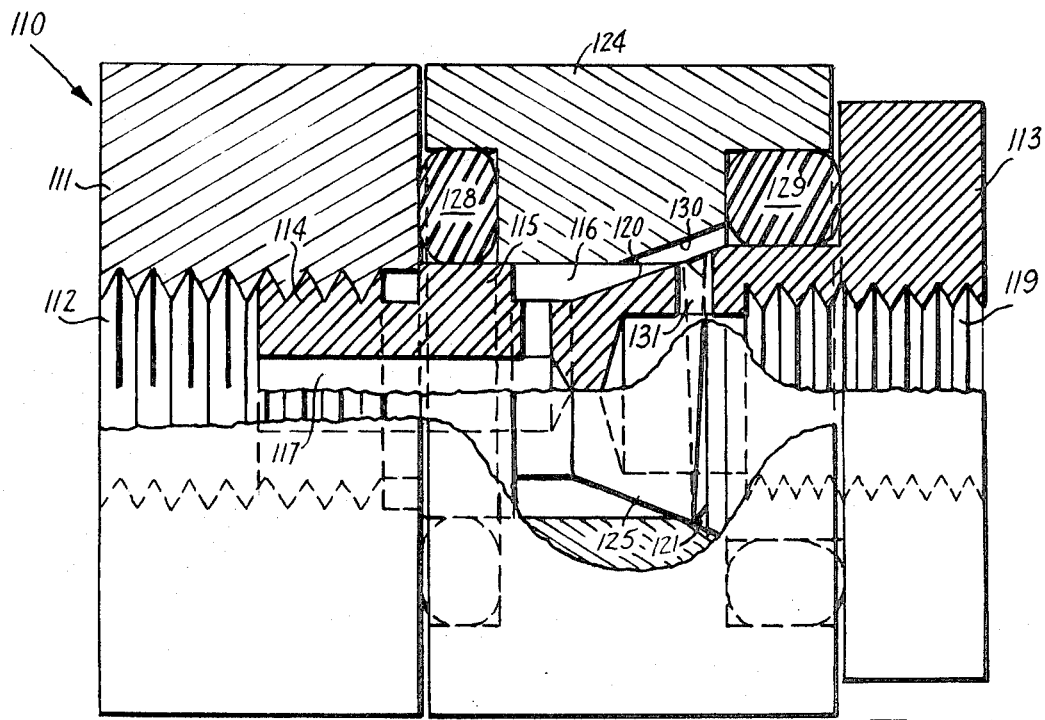
FIG.4
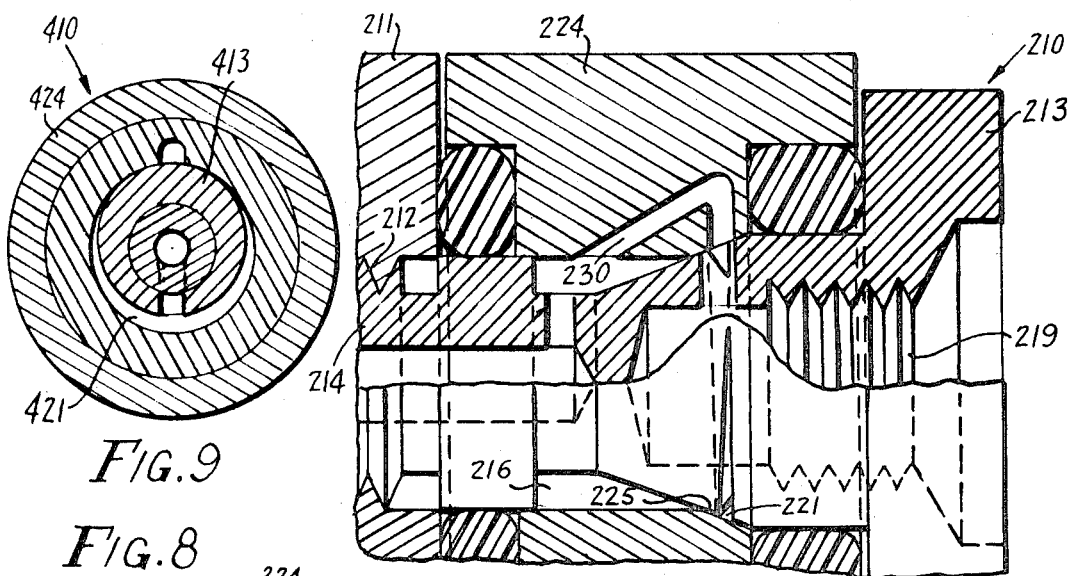
FIG.9
FIG.8
FIG.5
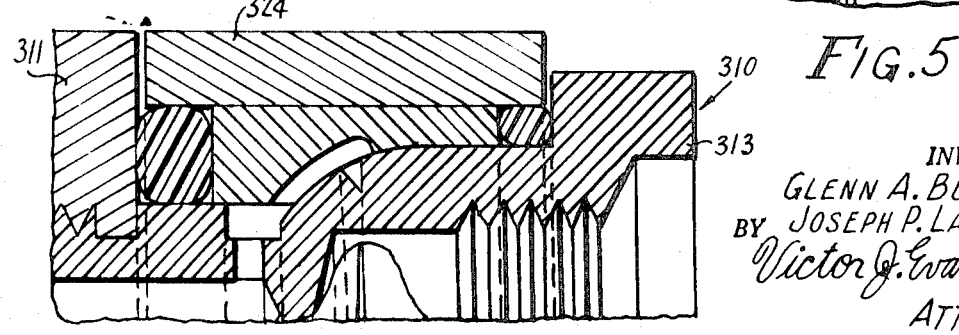
INVENTORS.
GLENN A. BURRIS
BY JOSEPH P. LARES
Victor J. Evans &co.
ATTORNEYS.

METERING VALVE

BACKGROUND OF THE INVENTION

Field of the Invention

The present invention relates to highly accurate metering valves which can be set to deliver a predetermined flow of material.

SUMMARY OF THE INVENTION

The present invention is directed to a metering valve having a central member and a body in which the central member is mounted with the body and the central member being arranged to have relative rotation therebetween. The central member carries an annular tapered metering groove which communicates with a port in the body to establish an orifice for the flow of material through the valve. In one form of the invention the central member is semi-spherical and in another form conical. In one form of the invention the seat member is rotatable for control and in another form of the invention the seat member is provided with a scale to permit the accurate positioning of the valve.

The primary object of the invention is to provide a metering valve which accurately meters the flow of fluid therethrough in any desired amount from 0 to 100 percent.

Other objects and advantages will become apparent in the following specification when considered in the light of the attached drawings.

BRIEF DESCRIPTION OF THE DRAWINGS

FIG. 1 is a side elevation of the invention shown partially broken away and in section for convenience of illustration;

FIG. 2 is a transverse cross-section taken along the line 2—2 of FIG. 1 looking in the direction of the arrows;

FIG. 3 is a fragmentary longitudinal sectional view taken along the line 3—3 of FIG. 2 looking in the direction of the arrows;

FIG. 4 is a side elevation of a modified form of the invention shown partially broken away and in section for convenience of illustration;

FIG. 5 is a side elevation of another modified form of the invention shown partially broken away and in section for convenience of illustration;

FIG. 8 is a fragmentary longitudinal sectional view of the structure illustrated in FIG. 6; and FIG. 9 is a transverse sectional view of another modified form of the invention illustrating the double ended groove structure.

DESCRIPTION OF THE PREFERRED EMBODIMENTS

Figure 6:
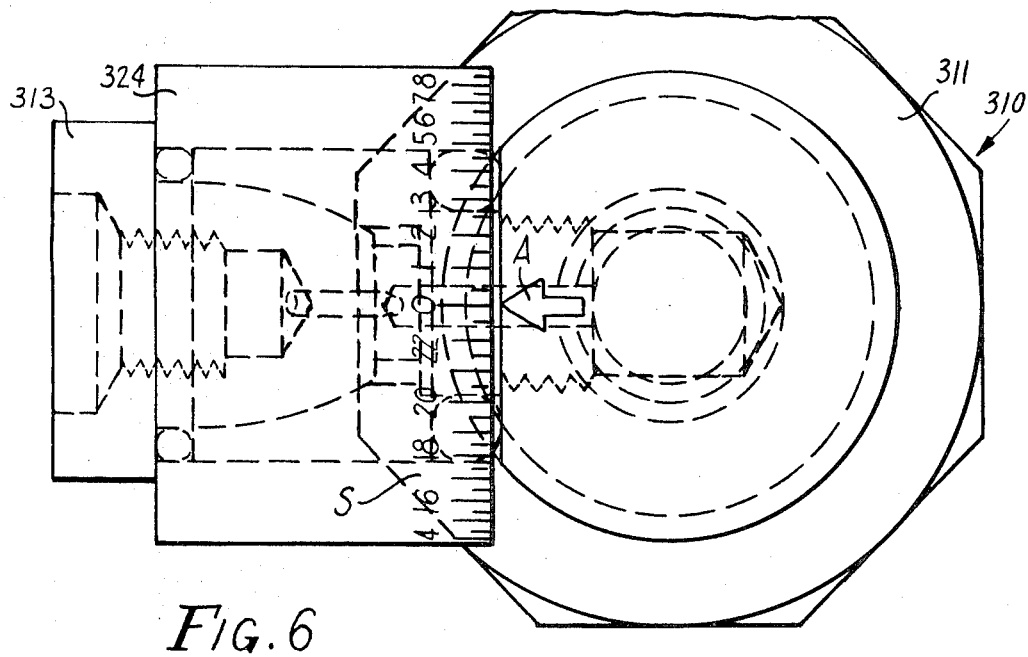
FIG. 6 is a top plan view of another modified form of the invention.

Referring now to the drawings in detail wherein like reference characters indicate like parts throughout the several figures the reference numeral 10 indicates generally a metering valve constructed in accordance with the invention.

The metering valve 10 includes a body 11 having an internally threaded bore 12 extending therethrough. A valve plug 13 has an externally threaded section 14 which is threaded into the threaded bore 12 to secure the valve plug 13 to the body 11. An annular portion 15 is formed on the valve plug 13 having a diameter equal to the diameter of the threads in the threaded portion 14 for sealing purposes. A reduced diameter portion 16 is formed on the plug 13 adjacent the annular portion 15. An axial bore 17 extends through the plug 13 from the end thereof having the threaded extension 14 thereon inwardly in line with the reduced diameter portion 16. A port 18 connects the bore 17 with the reduced diameter area 16 to permit communication therebetween.

A threaded bore 19 extends axially into the valve plug 13 at the end thereof opposite the threaded extension 14 for attaching the valve plug 13 to a fitting. The valve plug 13 has a semi-spherical intermediate portion 20 formed thereon for reasons to be assigned. A V-shaped tapered groove 21 extends annularly around the semi-spherical portion 20 tapering both in width and in depth from a zero point 22 to a full flow point 23.

A valve seat 24 is provided with a semi-spherical seat 25 which engages the semi-spherical portion 20 of the plug 13. The seat 24 has opposed annular recesses 26, 27 to receive O-ring seals 28, 29 respectively which engage the valve plug 13, the seat 24 and the body 11 to completely seal the valve 10 against leakage. A V-shaped arcuate port 30 is formed in the semi-spherical seat 25 of the seat 24 so as to extend completely across the width of the groove 21 regardless of the relative position of the plug 13 with respect to the seat 24. A port 31 extends from the large end 23 of the groove 21 into the bore 19 of the valve plug 13.

With the metering valve 10 connected into a fluid line the flow therethrough is readily adjustable from 0 to 100 percent by rotating the seat 24 with respect to the plug 13 so that the port 30 overlies the proper position on the groove 21 to give the desired flow.

In FIG. 4 a modified form of the metering valve is illustrated generally at 110. The metering valve 110 has a body 111 identical to the body 11 and has a valve plug 113 extending therein and secured thereto with a threaded extension 114 threaded into the threaded bore 112. An annular portion 115 is formed on the valve plug 113 and a reduced diameter portion 116 is formed thereon adjacent to the annular portion 115. An axial bore 117 extends through the valve plug 113 terminating beneath the reduced diameter portion 116. The valve plug 113 has an internally threaded bore 119 extending into the end thereof opposite the threaded extension 114.

A generally conical section 120 is formed on the valve plug 113 and has a V-shaped annular groove 121 extending thereabout and tapering in width and in depth from end to end. A seat member 124 has a conical seat 125 formed therein to cooperate with the conical portion 120 of the valve plug 113. A port 130 extends longitudinally across the seat 125 to communicate with the tapered groove 121 in any position therealong. The seat member 124 is sealed to the valve plug 113 by O-ring seals 128, 129. A port 131 connects the large end of the groove 121 with the bore 119 in the valve plug 113.

The metering valve 110 operates in the identical manner as the metering valve in the preferred form of the invention.

In FIG. 5 another modified form of the metering valve is indicated generally at 210. The metering valve 210 includes a body 211 having an axial threaded bore 212 extending therethrough. A valve plug 213 has a threaded extension 214 which is threaded into the threaded bore 212 as in the previous forms of the invention. The valve plug 213 has an internally threaded bore 219 and is otherwise identical to the valve plug 133. The seat member 224 has a bore 230 which opens into the conical seat 225 and into the reduced diameter portion 216 of the valve plug 213. The bore 230 is of angular form and is adapted to communicate with the tapered groove 221 in the valve plug 213.

Figure 7:
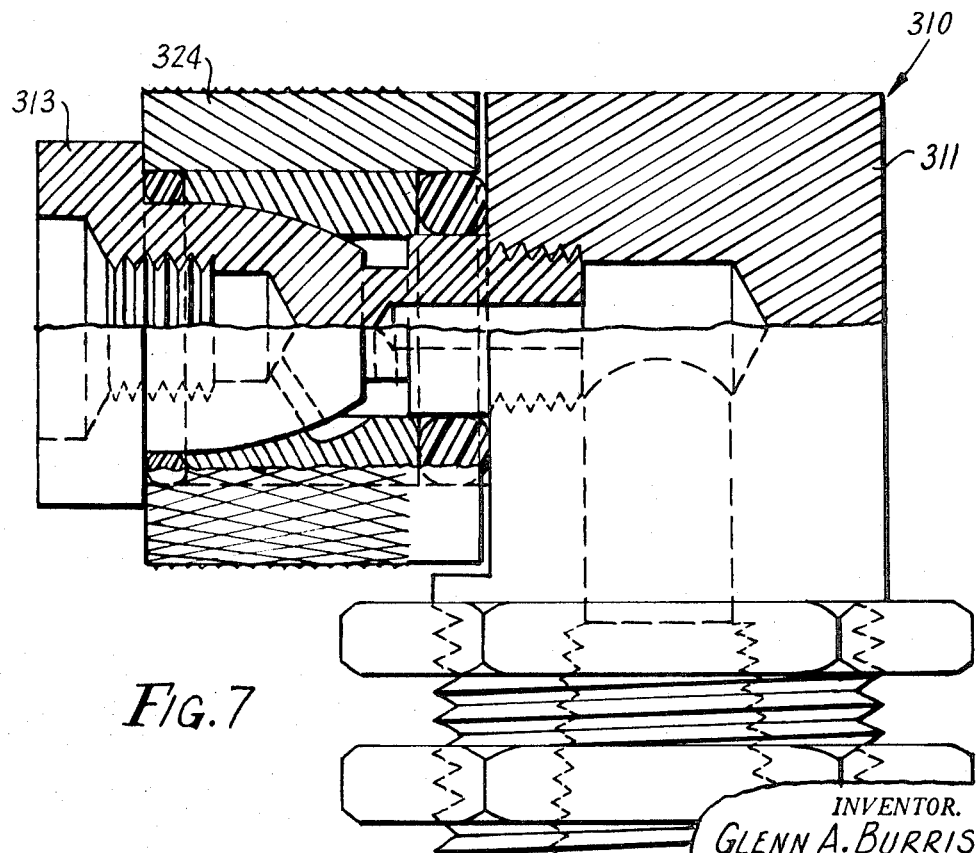
FIG. 7 is a side elevation of the structure illustrated in FIG. 6 shown partially broken away and in section for convenience of illustration.

In FIGS. 6 through 8 another modified metering valve is indicated generally at 310. The valve 310 utilizes a valve plug 313 identical to the valve plug 13 and a seat member 324 cooperates with the valve plug 313 in the same manner as the cooperation between the seat member 24 and the valve plug 13. A scale S extends peripherally around the seat member 324 to cooperate with an indicator arrow A located on the body 311. The body 311 extends perpendicularly from the valve plug 313 with relation to the valve seat 324 and is identical in the construction illustrated in FIGS. 6 through 8 to that illustrated in FIG. 1.

In FIG. 9 another modified metering valve is indicated generally at 410. The valve 410 includes a valve seat member 424 cooperating with a valve plug 413. The plug 413 has an annular groove 421 which tapers downwardly in width and in depth from a high point to a low point at each end thereof to permit the valve seat 424 to be rotated in either direction when establishing the proper metered flow.

Having thus described the preferred embodiments of the invention it should be understood that numerous structural modifications and adaptations may be resorted to without departing from the spirit of the invention.

I claim:

1. A metering valve comprising a body having a bore extending therethrough, an outwardly flaring conical seat formed in said body at one end of said bore and coaxial with said bore, a port extending completely across said conical seat communicating with said bore at one end of said port, a pair of annular recesses formed in each end of said body coaxial with said bore and communicating with said bore, a valve plug mounted for rotation in said bore and having a pair of cylindrical portions arranged in respective aligned relation to said recesses, an O-ring seal in each of said recesses in sealing engagement with the respective cylindrical portion of said valve plug, a conical portion on said valve plug between said cylindrical portions engaging said seat and having an annular groove formed therein tapering in both depth and width and communicating with said port, an axial bore in one end of said plug communicating with said groove, an axial bore in the other end of said plug communicating with said bore in said body between said recesses and communicating with said port, said plug on rotation in said body adjusting the position of said groove with respect to said port to vary the flow from said groove to said port from zero to one hundred percent, and means for detachably securing said plug in said body for rotation therein.

* * * * *